(12) United States Patent
Schroth et al.

(10) Patent No.: US 6,820,510 B2
(45) Date of Patent: Nov. 23, 2004

(54) FILLING LEVEL MEASURING DEVICE

(75) Inventors: Herbert Schroth, Schopfheim (DE); Armin Wendler, Freiburg i. Br. (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/363,705

(22) PCT Filed: Jun. 2, 2001

(86) PCT No.: PCT/EP01/06320
§ 371 (c)(1),
(2), (4) Date: Jul. 28, 2003

(87) PCT Pub. No.: WO02/23139
PCT Pub. Date: Mar. 21, 2002

(65) Prior Publication Data
US 2004/0025588 A1 Feb. 12, 2004

(30) Foreign Application Priority Data
Sep. 13, 2000 (DE) .......................................... 100 45 235

(51) Int. Cl.⁷ .............................................. G01D 21/00
(52) U.S. Cl. ................... 73/866.5; 73/290 R; 73/290 V
(58) Field of Search ............................ 73/866.5, 290 R, 73/290 V, 304 C

(56) References Cited

U.S. PATENT DOCUMENTS

| | | | | |
|---|---|---|---|---|
| 5,661,251 A | * | 8/1997 | Cummings et al. | 73/866.5 |
| 5,827,985 A | * | 10/1998 | Grieger et al. | 73/866.5 |
| 5,907,112 A | * | 5/1999 | Queyquep | 73/866.5 |
| 5,955,684 A | | 9/1999 | Gravel et al. | 73/866.5 |
| 5,992,251 A | * | 11/1999 | Grieger et al. | 73/866.5 |
| 6,019,007 A | * | 2/2000 | Grieger et al. | 73/866.5 |
| 6,118,282 A | * | 9/2000 | Grieger | 324/637 |

FOREIGN PATENT DOCUMENTS

| | | |
|---|---|---|
| EP | 0780664 A2 | 6/1997 |
| EP | 0928955 A2 | 7/1999 |
| WO | WO 98/25109 | 6/1998 |

* cited by examiner

*Primary Examiner*—Hezron Williams
*Assistant Examiner*—Rodney T. Frank
(74) *Attorney, Agent, or Firm*—Bacon & Thomas, PLLC

(57) ABSTRACT

The invention relates to a filling level measuring device which is used to measure the level of a filling material in a container. A probe is provided, which protrudes inside the container. The filling level measuring device can be mounted and dismounted without the probe needing to be moved in the container. The inventive device comprises a housing consisting of a first section, and a second section, the sections respectively comprising a central axial bore whereby the first section has an interior diameter which is smaller than that of the second section. A securing device is provided on the housing for securing the filling level measuring device onto the container. An insert is disposed in the housing in such a way so that it can pivot in relation to the housing, the insert being placed on a surface between the first and the second sections. A probe protrudes into the container and a connecting element is provided which connects the insert and the sensor along a prolongation of a longitudinal axis of the probe.

11 Claims, 3 Drawing Sheets

FILLING LEVEL MEASURING DEVICE

TECHNICAL FIELD

The invention relates to a fill level measurement apparatus for measuring a fill level of a fill material in a container. The apparatus includes a housing, which is to be secured to the container by means of a securing device, and a probe to be inserted into the container.

BACKGROUND

Examples of the type of fill level measurement apparatus to which this invention relates are those working with electromagnetic signals. The signals in these apparatuses are transferred onto at least one probe inserted into the container. The probe serves as a wave guide. It leads the signals into the container and brings the signals reflected from a surface of the fill material back out. The travel time, for example, of the electromagnetic signals can be determined, and, from that, the fill level is established.

An electronic circuit for producing electromagnetic signals, as well as a receiver- and evaluation-circuit for determining a fill level, are described e.g. in EP-A 780 665.

Suited to serve as the wave guide are e.g. bare metal wires, also termed "Sommerfeld wave guides", or insulated metal wires. These last are also known under the designation "Goubau wave guides".

Further examples of the type of fill level measurement apparatus to which this invention relates are capacitive fill level measurement apparatuses. In this case, the probe forms a capacitor with a wall of the container, and its capacity depends on the instantaneous fill level. Usually, the capacity is registered by means of a measurement circuit, and this is converted into a fill level dependent measurement signal.

Fill level measurement apparatuses of these types are used in a multiplicity of applications, both in the storage of materials and in the processing industry, e.g. in the chemical, food and oil industries.

For installing and removing conventional fill level measurement apparatuses, housing and probe are moved, typically screwed, relative to a container opening, through which the probe is to be placed in the container. Because of their small space requirements, the securing devices preferably used are screw-in threads provided on the housing, by means of which the housings are screwed into threaded nozzles on the container.

When removing such fill level measurement apparatuses, especially in the case of bulk goods containers, there is often the problem that the probe is at least partially covered by the fill material when the container is not completely emptied, and the fill material interferes with a free movement, especially a rotation, of the probe.

When installing, the probe placed in the container first rests against the fill material. A rotational movement of the probe required for securing the housing can lead to a twisting or entanglement of the cable and, in worst cases, even to knots in the cable.

The forenamed problems can certainly be avoided by emptying the container for every installing or removing of such a fill level measurement apparatus. This is, however, itself very expensive and leads, in some cases, to considerable extra costs, e.g. when a manufacturing process then has to be interrupted for some time.

EP-A 0 924 792 discloses a fill level measurement apparatus for measuring a fill level of a fill material in a container, which apparatus includes:

a housing having a first section and a second section, whose sections each have a central, axial bore,
wherein the first section has a smaller inner diameter than the second section, and
a securing device provided on the housing for securing the fill level measurement apparatus on the container.

The measurement apparatus in such case uses microwaves to measure fill level. The fill level measurement apparatus radiates microwaves into the container by means of an antenna extending into the container and arranged higher than a highest fill level to be measured. The microwaves are then reflected at the surface of the fill material and received by means of the antenna. The antenna is rotatably inserted into the housing and protrudes through the housing into the container. It is supported rotatably on a terrace surface between the first and second sections. The antenna is secured by a spring washer contacting a container-far annular surface of the antenna. The washer, in turn, is fixed by means of a snap ring entering into a groove in the housing. The end result is that the antenna can still be turned in the housing into a desired position, even after mounting of the housing on the container.

SUMMARY OF THE INVENTION

It is an object of the invention to provide a fill level measurement apparatus for measuring the fill level of a fill material in a container by means of a probe inserted into the container, in which the installing and removing of the fill level measurement apparatus can occur without requiring a movement of the probe in the container.

For this, the invention provides a fill level measurement apparatus for measuring a fill level of a fill material in a container, which includes:

a housing having a first section and a second section, which sections each have a central, axial bore,
wherein the first section has a smaller inner diameter than the second section,
a securing device provided on the housing for securing the fill level measurement apparatus on the container,
an insert arranged in the housing rotatably relative to the housing,
which is supported rotatably on a terrace surface between the first and second sections,
a probe extending into the container, and
a connecting element,
which connects the insert and the probe along an extension of a longitudinal axis of the probe.

In a further development of the invention, the connecting element is a threaded rod screwed into the insert, and the probe is screwed onto an end of the threaded rod extending through the first section.

In a still further development of the invention, a seal is arranged between a second-section-far end of the first section and the probe.

In a still further development, the seal exhibits a conical, outer, lateral surface, with which it contacts an inner, lateral surface of the first section of the housing rotatably relative to the housing about a longitudinal axis of the probe.

In a still further development of the invention, the seal exhibits a conical, inner, lateral surface, which contacts an outer, lateral surface of the probe and by way of which the seal is pressed in the direction of the second section when the probe is screwed in.

In a still further development of the invention, the seal is a ring with doubly conical cross section.

In a still further development of the invention, the seal exhibits internally and/or externally an annular, encircling groove, in which an additional sealing element is located.

In a still further development, the additional sealing element is a shaft seal.

In a still further development of the invention, the probe in operation is fed with electromagnetic signals, which move along the probe to the fill material surface, are reflected there, and then received, and whose travel time is a measure for the instantaneous fill level.

In another development, the probe forms together with a wall of the container a capacitor, whose capacity depends on the instantaneous fill level and in operation is registered by means of a measurement circuit and transformed into a fill level dependent measurement signal.

In a still further development, a fixing of the probe is possible with a clamping pin, which protrudes through an opening in a wall of the second section into a recess in the insert.

The invention and its advantages are explained in further detail on the basis of the figures of the drawing, in which an example of an embodiment is presented; in the figures, equal elements are given the same reference symbols.

DETAILED DESCRIPTION

Figure 1:
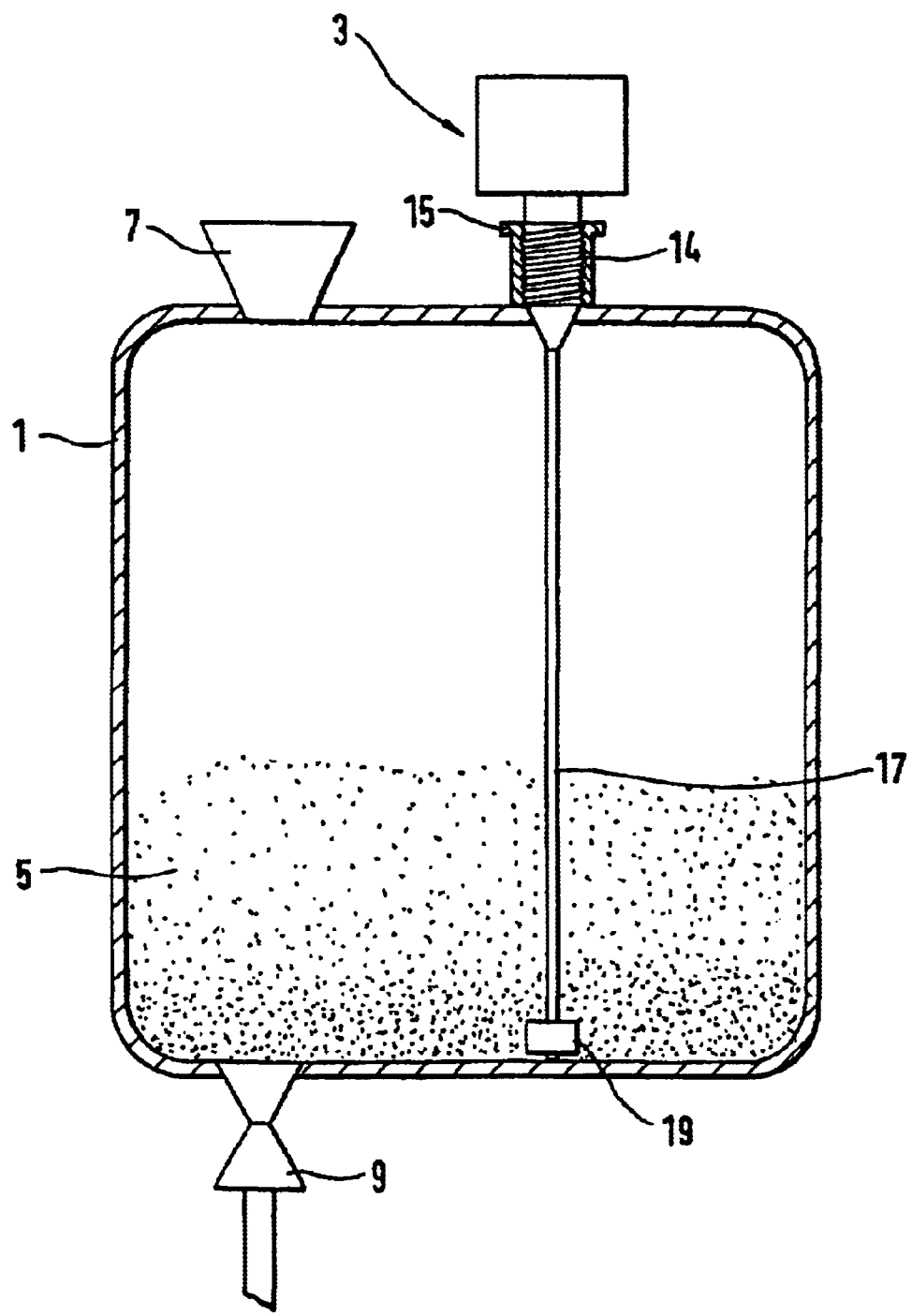
FIG. 1 shows a schematic representation of a fill level measurement apparatus arranged on a container.

FIG. 1 shows a schematic representation of a fill level measurement apparatus 3 arranged on a container 1. It serves for measuring the fill level of a fill material 5 in the container. The fill material 5 is brought into the container 1 through a filling nozzle 7 arranged on the top of the container 1 and discharged through an outlet valve 9 on the bottom of the container 1.

Figure 2:
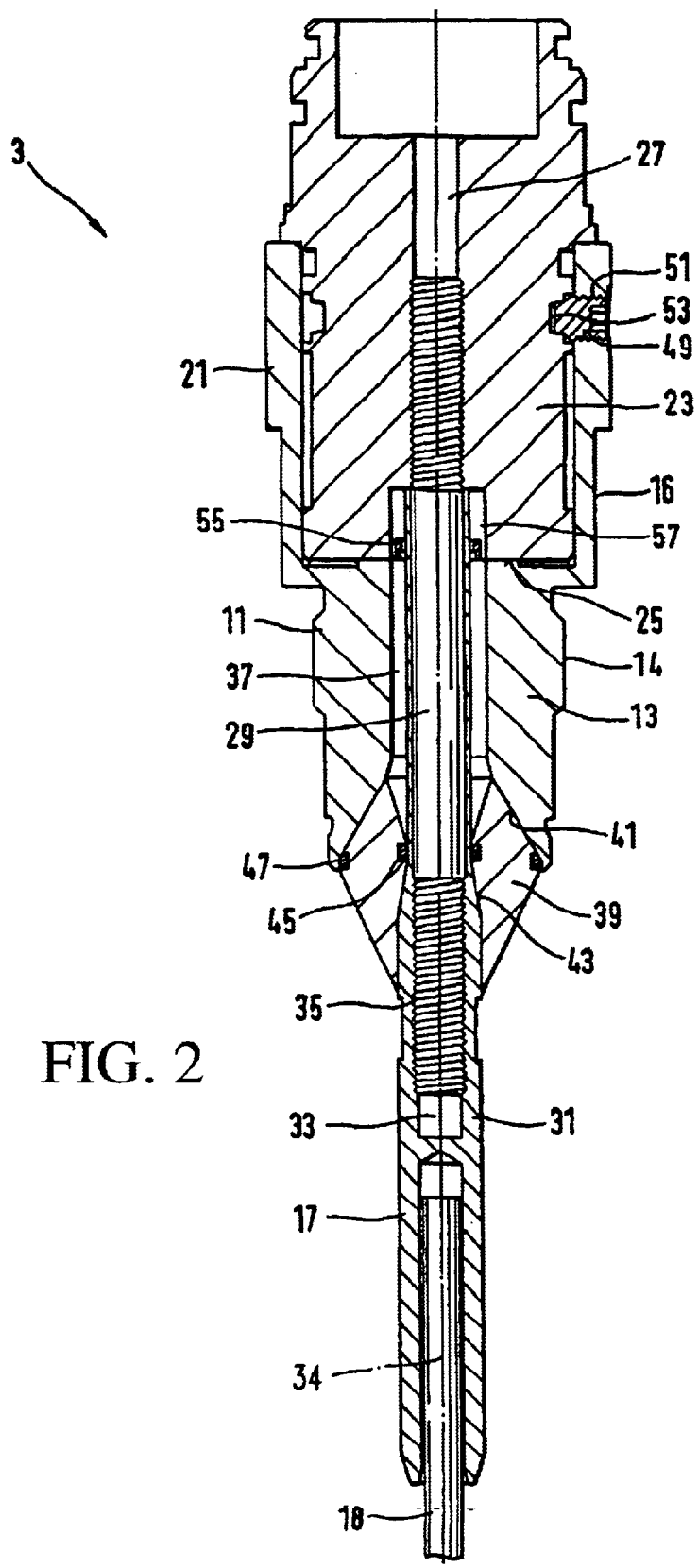
FIG. 2 shows in longitudinal cross section, an enlarged, schematic representation of the region of the fill level measurement apparatus essential to the invention.

The fill level measurement apparatus 3 has a housing 11, shown in FIG. 2, which exhibits a first section 13 provided with a securing device 14. The fill level measurement apparatus 3 is secured on the container 1 with the securing device 14. In the example of an embodiment presented here, the securing device 14 is an external thread, which is screwed into a nozzle 15 arranged on the top of the container 1. To aid in mounting, the housing 11 has an external, hexagonally shaped section 16 above the external thread, so that a wrench can be applied. The securing device 14 offers the advantages that it requires only a very small space and small openings in the container 1 sufficient for applying the fill level measurement apparatus.

The fill level measurement apparatus has a probe 17, which extends through the housing 11 into the container 1. The prove 17 is e.g. a rod or a wire. A cable is, however, also usable. Such probes 17 are cable probes, which protrude into the container 1. A weight 19 can be secured on the end of the probe, for tensioning the probe 17. Both bare rods, wires or cables of metal, e.g. a high-quality steel, as well as insulated metal wires, rods or cables, can be used. A suitable insulator is e.g. polytetrafluoroethylene (PTFE).

A length for the probe 17 is to be chosen such that the probe in the stretched-out condition ends below the lowest fill level to be measured in the container 1.

FIG. 2 shows an enlarged, schematic presentation in longitudinal cross section of the region of the fill level measurement apparatus essential for the invention.

The housing 11 exhibits, along with the first section 13, a second section 21 immediately bordering thereon. The first and second sections 13, 21 each have a central, axial bore. The first section 13 has, however, a smaller inner diameter than the second section 21.

In the second section 21 is arranged a rotationally symmetric insert 23, which nearly completely fills the second section 21. In this example, insert 23 is essentially cylindrical. Insert 23 is arranged rotatably with reference to the housing 11. Thus, it sits rotatably on a terrace surface 25 situated between the first and second sections 13, 21.

A connecting element connects the insert 23 and the probe 17 along an extension of a longitudinal axis of the probe 17. This purely axial connection assures that the insert 23 and the probe 17 are rotatable relative to the housing 11.

In the illustrated example of an embodiment, the connection is a threaded rod 29. Insert 23 has a traversing, central, axial bore 27, whose end toward the first section 13 is provided with an internal thread, into which the threaded rod 29 is screwed.

The probe 17 is equipped with a union fitting 31, which has a central, axial bore 33 with an internal thread 35. Fitting 31 has a screwed connection onto an end of the threaded rod 29 extending from the first section 13. A threaded rod 29—far end of fitting 31 either merges continuously into the region of the probe 17 leading into the container 1, or, as illustrated in the example of an embodiment in FIG. 2, a further axial bore 34 is provided, containing a region 18 of the probe 17 leading into the container 1, secured e.g. by crimping or by clamping screws.

Between the first section 13 and the threaded rod 29, the fitting 31, and the probe 17, there is an encircling, cylindrical gap 37. This can e.g. be filled with a dielectric.

Naturally, other connecting elements can also be used for connecting the insert 23 and the probe 17 along an extension of the longitudinal axis of the probe 17. Thus, for example, a rod can be used, with which the insert 23 and the probe 17 are connected by means of a snap connection. Likewise, the probe 17 can be connected directly with the insert 23 in an extension of the longitudinal axis of the probe.

Between a second section 23—far end of the first section 13 and the probe 17 is a seal 39. In the illustrated example of an embodiment, seal 39 is a ring of doubly conical cross section encircling the probe 17. Seal 39 is made of a dielectric, e.g. of polytetrafluoroethylene (PTFE).

Seal 39 has a conical, outer, lateral surface 41, with which it contacts an inner, lateral surface of the first section 13 of the housing 11 rotatably about a longitudinal axis of the probe 17. For improving the ability of the probe 17 to rotate relative to the housing 11, this outer, lateral surface 41 can be provided with a lubricant, e.g. an oil or a fat.

Additionally, seal 39 has a conical, inner, lateral surface 43, which contacts an outer, lateral surface of the probe 17 and by way of which seal 39 is pressed in the direction of the second section 23 as the probe is screwed in.

Seal 39, and the rotatably seated insert 23 into which the threaded rod 29 is screwed, permit a free rotation of the probe 17 relative to the housing 11. During installing and removing of the fill level measurement apparatus, a movement of the probe 17 in the container 1, particularly a rotational movement, is not required. The housing 11 can be screwed into, or out of, the nozzle 15, without there being any associated movement of the probe 17.

For further improvement of the sealing action, seal 39 can have internally and/or externally, annularly encircling grooves 45, 47, in which, in each case, an additional sealing element is situated. While the material of the seal 39 is limited depending on the particular application, the material from which the one or more additional sealing elements is made can essentially be freely selected. The additional sealing elements are protected in the grooves 45, 47 and do not have to withstand the pressure in the container, which can be quite high, depending on the application, and the mechanical wear of abrasive fill materials, since they only come in contact with the fill material to a very limited extent.

A shaft seal is especially suited to serve as the additional sealing element for the outer groove 47. Shaft seals facilitate the ability of the probe to rotate relative to the housing 11.

In the fill level measurement apparatus illustrated in FIG. 2, a clamping pin 49 is provided, which, when required, enables a fixing of the insert 23 and, consequently, a preventing of any rotation of the probe relative to the housing 11. This is e.g. of advantage during transport of the fill level measurement apparatus or in actual measuring operation, subsequent to installation of the fill level measurement apparatus.

The clamping pin 49 reaches through an opening 51 in a wall of the second section 23 into a recess 53 in the insert 23.

The fill level measurement apparatus works e.g. with electromagnetic signals (as already described above), for which the probe forms a wave guide. In this case, the probe is connected through the threaded rod 29 with an electronic circuit (not shown in FIG. 2), which in operation feeds the probe 17 with electromagnetic signals.

The coupling of electromagnetic signals onto the probe 17 can e.g. occur over a coaxial cable, whose inner conductor is connected through the threaded rod 29 with the probe 17 and whose outer conductor is connected e.g. by way of a metal sleeve with the housing 11. The sleeve can e.g. be drawn over the insert 23 and held rotatably in a groove in the housing 11. In this case, insert 23 must be made of a dielectric, e.g. of poly (aryl ether ketone) (PEEK).

Figure 3:
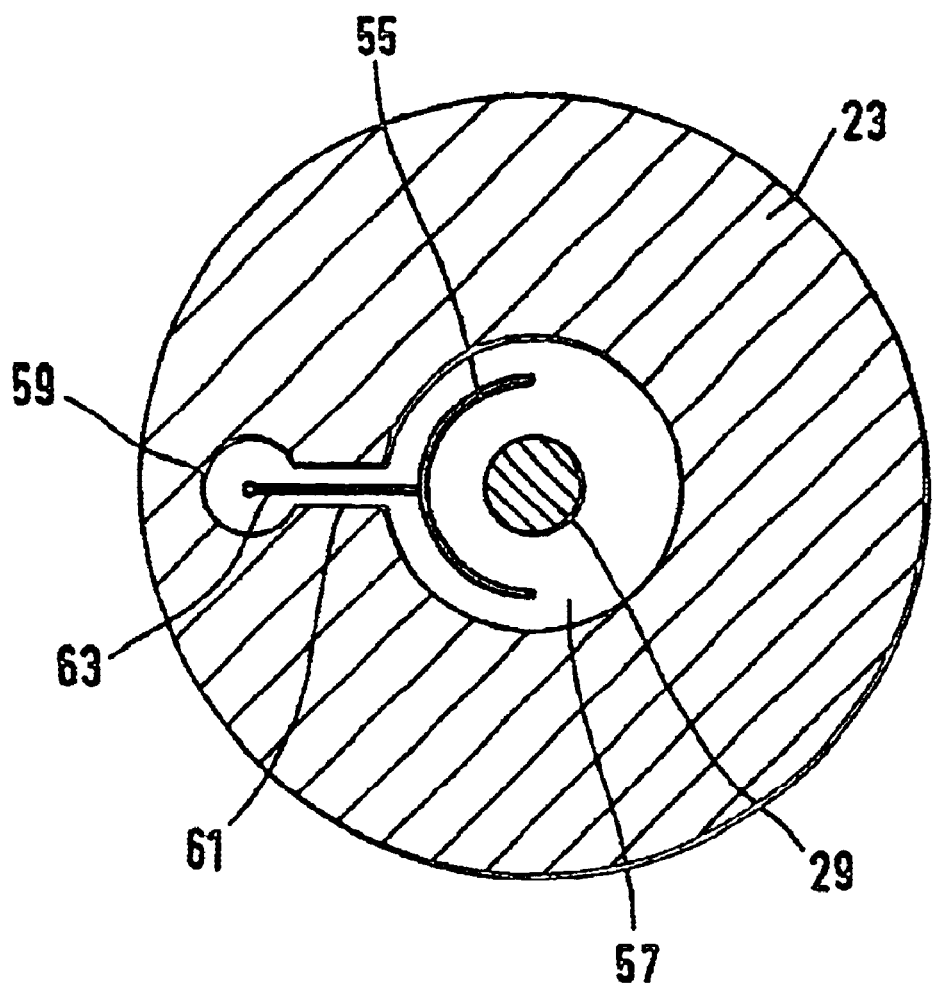
FIG. 3 shows a schematic representation of a coupling of electromagnetic signals onto the probe.

Alternatively, a coupling can be used as described e.g. in the German patent application No. DE-A 100 27 228.2 filed May 31, 2000. Such a coupling is illustrated schematically in FIG. 3. It is constructed e.g. of a half-ring 55, which surrounds the threaded rod 29. The half-ring 55 is spaced from the threaded rod 29. For accommodating the half-ring, the bore 27 extending in insert 23 opens at its first section 13-near end into a cylindrical chamber 57. The insert 23 is made in this case of an electrically conductive material, e.g. a high-grade steel, and has a further bore 59 (not visible in FIG. 2) extending parallel to bore 27. Additionally, there is a connecting channel 61 between a first section 13-near end of the bore 59 and the chamber 57. The coupling is connected to a coaxial cable, over which the electromagnetic signals are guided to the probe 17 and from there back again. An inner conductor of this coaxial cable is connected with the half-ring 55 by a conductor 63 leading through the bore 59 and the connecting channel 61. An outer conductor is connected with the electrically conductive insert 23, which is preferably connected to ground or to a fixed reference potential. Electromagnetic signals coming over the coaxial cable, the conductor 63 and the half-ring 55 are coupled onto the probe 17, travel along the probe to the fill material surface, are reflected there, and come back to be received by the fill level measurement apparatus. Their travel time is a measure of the instantaneous fill level.

The measurement apparatus can, naturally, as already mentioned above, also be a capacitive fill level measurement apparatus, in which the probe 17 together with a wall of the container form a capacitor, whose capacity depends on the instantaneous fill level. The capacity is registered by means of a measurement circuit and converted into a fill level dependent measurement signal. In this case, the probe 17 is connected through the threaded rod 29 with a connecting conductor (not shown in FIG. 2), over which e.g. an alternating voltage is applied to the probe 17. In this case, insert 23 is an insulator. The housing 11 is metallic, and housing 11 and container 1 are preferably grounded. Suitable for the measurement circuit, for example, is a frequency measurement oscillator circuit, in which the capacitor formed by the probe 17 and the container 1 is connected as a frequency determining component.

What is claimed is:

1. Fill level measurement apparatus for measuring a fill level of a fill material in a container, which includes:
    a housing having a first section and a second section, said first section and said second section each have a central, axial bore, wherein the first section has a smaller inner diameter than the second section;
    a securing device provided on said housing for securing the fill level measurement apparatus on the container;
    an insert arranged in said housing rotatably relative to said housing, said insert being supported rotatably on a terrace surface between said first section and said second section;
    a probe extending into the container; and
    a connecting element which connects said insert and said probe along an extension of a longitudinal axis of said probe.

2. The fill level measurement apparatus as claimed in claim 1, which said connecting element is a threaded rod screwed into said insert, and said probe is screwed onto an end of said threaded rod extending through said first section.

3. The fill level measurement apparatus as claimed in claim 1, further including: a seal arranged between a second section far end of said first section and said probe.

4. The fill level measurement apparatus as claimed in claim 3, in which said seal has a conical, outer, lateral surface, with which it contacts an inner, lateral surface of said first section of said housing rotatably relative to said housing about a longitudinal axis of said probe.

5. The fill level measurement apparatus as claimed in claim 3, in which said seal has a conical, inner, lateral surface, which contacts an outer, lateral surface of said probe and by way of which said seal is pressed in the direction of said second section as said probe is screwed in.

6. The fill level measurement apparatus as claimed in claim 1, in which said seal is a ring with doubly conical cross section.

7. The fill level measurement apparatus as claimed in claim 1, in which said seal has internally and/or externally an annular, encircling groove, in which an additional sealing element is located.

8. The fill level measurement apparatus as claimed in claim 7, in which said additional sealing element is a shaft seal.

9. The fill level measurement apparatus as claimed in claim 1, in which said probe in operation is fed with electromagnetic signals, which move along said probe to the fill material surface, are reflected there, and then received back, and whose travel time is a measure for the instantaneous fill level.

10. The fill level measurement apparatus as claimed in claim 1, in which said probe forms together with a wall of the container a capacitor, whose capacity depends on the instantaneous fill level and is registered by means of a measurement circuit and transformed into a fill level dependent measurement signal.

11. The fill level measurement apparatus as claimed in claim 1, in which a fixing of said probe is possible with a clamping pin, which protrudes through an opening in a wall of said second section into a recess in said insert.

* * * * *